US012761127B2

(12) United States Patent
Yang et al.

(10) Patent No.: US 12,761,127 B2
(45) Date of Patent: Oct. 13, 2026

(54) ISOLATION DEVICE AND ISOLATION METHOD

(71) Applicant: Shenzhen Huixin Life Technologies Co., Ltd, Shenzhen (CN)

(72) Inventors: Yijie Yang, Shenzhen (CN); Yuchao Chen, Shenzhen (CN)

(73) Assignee: Shenzhen Huixin Life Technologies Co., Ltd, Shenzhen (CN)

( * ) Notice: Subject to any disclaimer, the term of this patent is extended or adjusted under 35 U.S.C. 154(b) by 1196 days.

(21) Appl. No.: 17/774,914

(22) PCT Filed: Jan. 28, 2022

(86) PCT No.: PCT/CN2022/074606
§ 371 (c)(1),
(2) Date: May 6, 2022

(87) PCT Pub. No.: WO2023/141944
PCT Pub. Date: Aug. 3, 2023

(65) Prior Publication Data
US 2024/0151614 A1 May 9, 2024

(51) Int. Cl.
*G01N 1/40* (2006.01)
*B01D 63/08* (2006.01)
*B01D 63/16* (2006.01)
*B01D 65/08* (2006.01)
(Continued)

(52) U.S. Cl.
CPC ........... *G01N 1/4077* (2013.01); *B01D 65/08* (2013.01); *B01D 2321/2058* (2013.01); *B01D 2321/35* (2022.08); *G01N 2001/4088* (2013.01); *G01N 2001/4094* (2013.01)

(58) Field of Classification Search
None
See application file for complete search history.

(56) References Cited

U.S. PATENT DOCUMENTS

2019/0160433 A1* 5/2019 Chen ...................... B01D 69/02

FOREIGN PATENT DOCUMENTS

CN 104690737 B 8/2016
CN 207478341 U 6/2018
CN 110876982 A 3/2020
(Continued)

OTHER PUBLICATIONS

English translation CN 211784638 (Year: 2020).*
English translation of CN 104690737 (Year: 2015).*
English Translation of KR-20120139399-A (Year: 2012).*

*Primary Examiner* — Brittany I Fisher
(74) *Attorney, Agent, or Firm* — ScienBiziP, P.C.

(57) ABSTRACT

An isolation device includes an isolation chip, a pressing assembly, two ultrasonic generators, a differential pressure driving system, a frequency conversion module, and a controller. The isolation chip includes a sample reservoir, a first chamber, and a second chamber. The pressing assembly drives the two ultrasonic generators to move towards the isolation chip to make in contact with the first and second chambers. The frequency conversion module controls the differential pressure driving system to generate a negative pressure in the first and second chambers alternately. The controller controls the two ultrasonic generators to generate two ultrasonic waves when negative pressures are cancelled in the first and second chambers. An isolation method is also disclosed.

9 Claims, 13 Drawing Sheets

(51) Int. Cl.
*B01L 3/00* (2006.01)
*C12M 1/00* (2006.01)

(56) References Cited

FOREIGN PATENT DOCUMENTS

| | | | | | |
|---|---|---|---|---|---|
| CN | 211784638 | U | | 10/2020 | |
| CN | 112694969 | A | | 4/2021 | |
| CN | 113195080 | A | | 7/2021 | |
| KR | 20120139399 | A | * | 12/2012 | ............ C12M 41/00 |

* cited by examiner

ISOLATION DEVICE AND ISOLATION METHOD

FIELD

The subject matter herein generally relates to isolation of exosomes, and more particularly, to an isolation device and an isolation method for isolating target particles from a liquid sample.

BACKGROUND

Exosomes are small vesicles with a structure of double phospholipid membranes having a size of 30 to 150 nm, which are continuously secreted by living cells. As a carrier in intercellular communication, exosomes carry specific components, such as proteins, nucleic acids, and metabolic small molecules, from mother cells. A large number of studies have shown that exosomes are involved in a variety of events in tumor development, including immune escape, angiogenesis, tumor metastasis, and tumor drug resistance. Exosomes can be continuously released by cancer cells and then enter a patient's blood circulation system. The double phospholipid membranes can effectively protect the proteins and nucleic acids being carried. Exosomes widely and stably exist in a variety of clinical samples, including blood, urine, ascites, tissue fluid, tears, saliva, and cerebrospinal fluid. The number of exosomes in blood and urine is large, and clinical sampling is easy. Therefore, exosomes are considered to be the key research objects in the field of in vitro diagnostic research and tumor clinical detection. Exosomes are expected to play a great clinical value in early tumor diagnosis, evaluation of tumor metastasis and recurrence, evaluation of tumor heterogeneity, dynamic detection of tumor occurrence, development and curative effect, detection of drug-resistant mutations, and personalized drugs.

At present, the main obstacle to the clinical application of exosomes is how to isolate exosomes and their subsets from a complex biological fluid. However, existing isolation methods are complex in the operation process, and also have high time consumption and low isolation efficiency. Moreover, the filtration membrane is easily clogged, the yield is low, and the purity is low.

SUMMARY

In order to overcome some or all of the above problems, an isolation device is needed.

On the other hand, an isolation method for isolating target particles from liquid samples is also needed.

In a first aspect, an isolation device for isolation of target particles from a liquid sample is provided. The isolation device includes an isolation chip, an oscillation system, a differential pressure driving system, a frequency conversion module, and a controller. The isolation chip includes a sample reservoir, at least one first chamber disposed on a side of the sample reservoir, and at least one second chamber disposed on the other side of the sample reservoir away from the at least one first chamber. The sample reservoir is used for receiving the liquid sample. One of the first chambers which is closest to the sample reservoir is connected to the sample reservoir through a first filtration membrane. One of the second chambers which is closest to the sample reservoir is connected to the sample reservoir through a second filtration membrane. An average pore size of the first filtration membrane and an average pore size of the second filtration membrane are smaller than a size of the target particles. The oscillation system includes a pressing assembly and two ultrasonic generators disposed on the pressing assembly. The pressing assembly drives the two ultrasonic generators to move towards the isolation chip to make in contact with an outer surface of the outermost first chamber and an outer surface of the outermost second chamber. The frequency conversion module is connected to the outermost first chamber and the outermost second chamber through the differential pressure driving system. The frequency conversion module is configured to control the differential pressure driving system to generate a negative pressure in the first chamber and the second chamber alternately. The controller controls the two ultrasonic generators to vibrate to generate two ultrasonic waves when the differential pressure driving system stops to generate the negative pressure in the first chamber or the second chamber.

In the embodiment of the present disclosure, a frequency of each of the two ultrasonic waves is 15 KHz to 80 KHz. Within a period of each of the two ultrasonic waves, a duty cycle of each of the two ultrasonic waves is 10% to 90%.

In the embodiment of the present disclosure, a ratio of change between two frequencies of the two ultrasonic waves is less than or equal to 30%, and a ratio of change between the two duty cycles of the two ultrasonic waves is less than or equal to 30%.

In the embodiment of the present disclosure, the controller is used to power on and power off the two ultrasonic generators, within a period of the power on and the power off, a ratio of the power on is 10% to 100%.

In the embodiment of the present disclosure, the two ultrasonic generators are located on a same horizontal plane.

In the embodiment of the present disclosure, each of the two ultrasonic generators includes a horn close to the isolation chip and a piezoelectric ceramic unit connected to the horn.

In the embodiment of the present disclosure, the horn includes a first horn portion, a second horn portion, a third horn portion, and a connecting portion connected with each other in that order. The connecting portion is connected to the piezoelectric ceramic unit. An end surface of the first horn portion away from the second horn portion is configured to make in contact with the outer surface of the outermost first chamber or the outer surface of the outermost second chamber. Along a direction perpendicular to an extension direction of the horn, a size of the second horn portion is smaller than a size of the first horn portion and a size of the third horn portion.

In the embodiment of the present disclosure, the piezoelectric ceramic unit includes a plurality of piezoelectric ceramic sheets, a plurality of electrode sheets stacked with the plurality of piezoelectric ceramic sheets, an insulating sleeve, and a connector. The piezoelectric ceramic sheets are disposed alternately with the electrode sheets. The piezoelectric ceramic sheets and the electrode sheets are sleeved on the insulating sleeve. The connector penetrates through the insulating sleeve to detachably connect to the horn.

In the embodiment of the present disclosure, each ultrasonic generator further includes an adjusting block disposed on the piezoelectric ceramic unit away from the horn. The connector is further connected to the adjusting block.

In a second aspect, an isolation method for isolating target particles from liquid samples is provided. The method includes:

- an isolation chip is provided, the isolation chip is the above-mentioned isolation chip, and a liquid sample can be added to the sample reservoir;

the pressing assembly is controlled to drive the two ultrasonic generators to move towards the isolation chip, so that end surfaces of the two ultrasonic generators close to the isolation chip make in contact with an outer surface of the outermost first chamber and an outer surface of the outermost second chamber;

the first chamber is evacuated to generate a negative pressure in the first chamber, causing compositions in the sample reservoir that are smaller than pores of the corresponding first filtration membrane to pass through the corresponding first filtration membrane under the negative pressure and enter the first chamber;

the negative pressure is cancelled in the first chamber, and the two ultrasonic generators are controlled to generate two ultrasonic waves;

the second chamber is evacuated to generate a negative pressure in the second chamber, causing compositions in the sample reservoir that are smaller than pores of the corresponding second filtration membrane to pass through the corresponding second filtration membrane under the negative pressure and enter the second chamber; and the negative pressure is cancelled in the second chamber, and the two ultrasonic generators are controlled to generate another two ultrasonic waves.

The isolation chip and the ultrasonic generators are disposed separately in the isolation device. The pressing assembly can drive the ultrasonic generators to move to make in contact with the isolation chip to provide ultrasonic waves for the isolation chip to vibrate the isolation chip. Thus, clogging of the first filtration membrane and the second filtration membrane is avoided, and the isolation efficiency and purity are improved. Vibrators do not need to be installed in the isolation chip, which reduces the manufacturing difficulty and cost of the isolation chip.

The ultrasonic generator has a specific structure and parameters to match the isolation chip. The ultrasonic waves generated by the ultrasonic generators ensure that the particles attached on the first filtration membrane and the second filtration membrane fall off. Thus, clogging of the filtration membranes can be avoided, and the isolation efficiency and purity are improved.

The pressing assembly provides linkage between the two ultrasonic generators, so that the two ultrasonic generators can be made in contact with or can be separated from the isolation chip. The linkage process is simple, and the ultrasonic generators are firmly in contact with the isolation chip, ensuring that the ultrasonic waves can be transmitted to the first filtration membrane and the second filtration membrane without damaging the isolation chip.

BRIEF DESCRIPTION OF THE DRAWINGS

Implementations of the present technology will now be described, by way of embodiment, with reference to the attached figures. Obviously, the drawings are only some embodiments of the present disclosure. For those of ordinary skill in the art, other drawings can be obtained based on these drawings without creative work.

Figure 1:
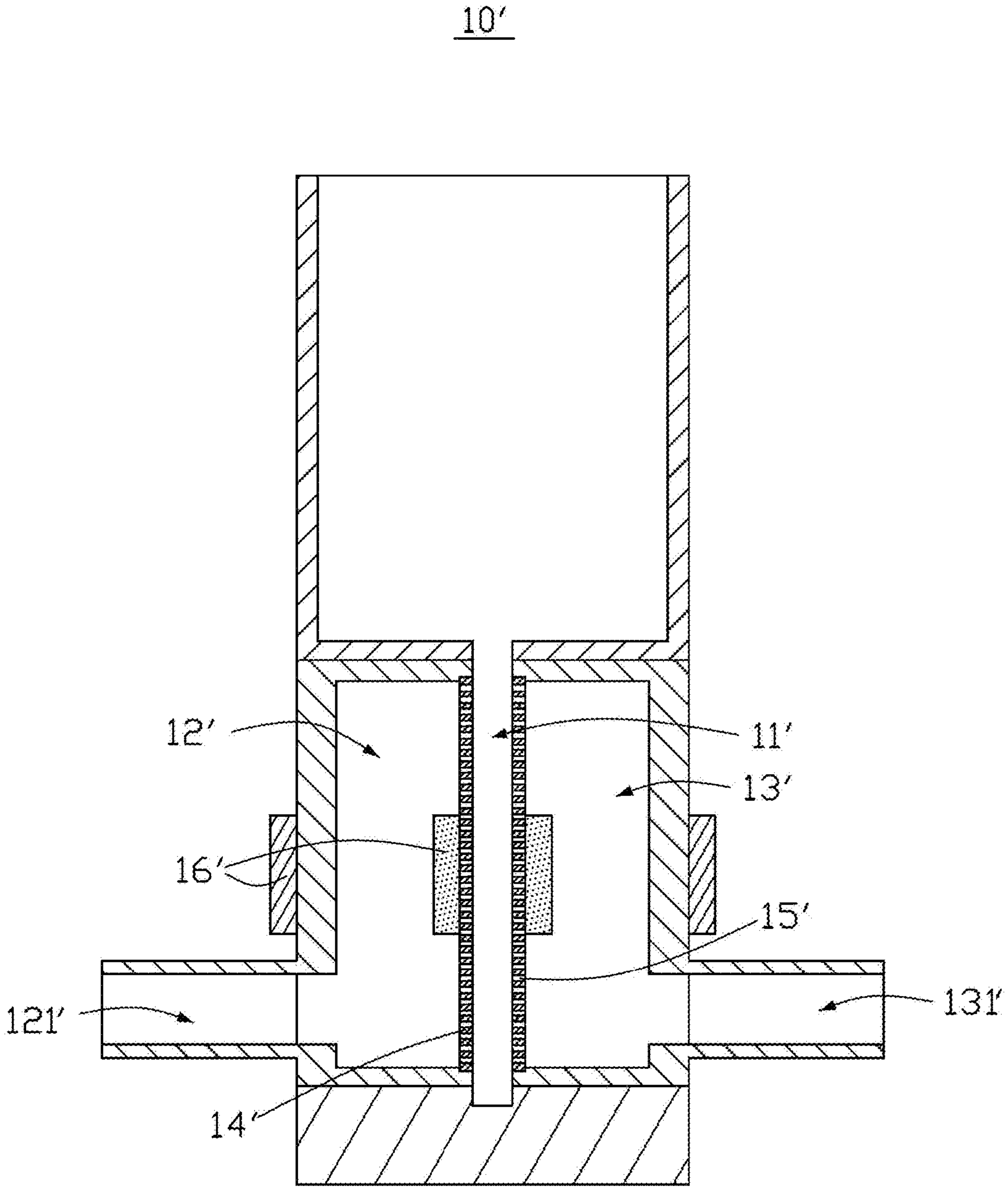
(Related art) FIG. 1
FIG. 1 is a diagrammatic view of an isolation chip of related art.

Implementations of the disclosure will now be described, by way of embodiments only, with reference to the drawings.

SYMBOL DESCRIPTION OF MAIN COMPONENTS isolation device 100; isolation chip 10, 10'
sample reservoir 11, 11'; first chamber 12, 12'
first opening 121, 121'; second chamber 13, 13'
second opening 131, 131'; first filtration membrane 14, 14'
second filtration membrane 15, 15'; vibrator 16'
oscillation system 70; pressing assembly 20
base 21; moving mechanism 22
first slide rail 221; first slider 222
first mounting plate 223; second slide rail 224
second slider 225; second mounting plate 226
elastic member 227; driving mechanism 23
driving shaft 231; displacement sensing unit 24
first connecting piece 241; second connecting piece 242
optocoupler 243; ultrasonic generator 30
horn 31; first horn portion 311
second horn portion 312; third horn portion 313
connecting portion 314; piezoelectric ceramic unit 32
piezoelectric ceramic sheet 321; electrode sheet 322
insulating sleeve 323; connector 324
adjusting block 33; frequency conversion module 40
frequency converter 41; valve 42
differential pressure driving system 50; first vacuum pump 51
second vacuum pump 52; connecting pipe 53
controller 60; size h1, h2, h3

DETAILED DESCRIPTION

Implementations of the disclosure will now be described, by way of embodiments only, with reference to the drawings. The described embodiments are only portions of the embodiments of the present disclosure, rather than all the embodiments. The disclosure is illustrative only, and changes may be made in the detail within the principles of the present disclosure. It will, therefore, be appreciated that the embodiments may be modified within the scope of the claims.

It should be noted that when a component is referred to as being “fixed to” or “mounted on” another component, the component can be directly in contact with another component or a middle component may exist therebetween. When a component is considered to be "arranged on" another component, the component can be directly on another component or a middle component may exist therebetween. The term "and/or" as used herein means any combinations of one or more related listed items.

Referring to FIG. 1, an isolation chip 10' of related art is illustrated, the isolation chip 10' includes a sample reservoir 11', a first chamber 12', and a second chamber 13'. The first chamber 12' and the second chamber 13' are disposed at opposite sides of the sample reservoir 11'. The first chamber 12' is connected to the sample reservoir 11' through a first filtration membrane 14'. The second chamber 13' is connected to the sample reservoir 11' through a second filtration membrane 15'. The sample reservoir 11' can receive liquid samples. An average pore size of the first filtration membrane 14' and an average pore size of the second filtration membrane 15' are smaller than a size of target particles. The first chamber 12' defines a first opening 121'. The first chamber 12' is connected to an exterior through the first opening 121'. The second chamber 13' defines a second opening 131'. The second chamber 13' is connected to the exterior through the second opening 131'. To resolve low efficiency in filtration and clogging of the filtration membrane, vibrators 16' are disposed on an outer surface of the first chamber 12', an outer surface of the second chamber 13', the first filtration membrane 14', and the second filtration membrane 15'. Such vibration of the vibrators 16' may prevents the filtration membranes from being clogged and improves the filtration efficiency, the yield, and the purity. Installation of the vibrators 16' in the isolation chip 10' is problematic, especially on the first filtration membrane 14' and the second filtration membrane 15'. It is difficult to connect wires when the vibrator 16' is disposed on the first filtration membrane 14' or the second filtration membrane 15'. There is a risk of electric leakage of the wire. Furthermore, the vibrator 16' can be easily dislodged from the first filtration membrane 14' or the second filtration membrane 15' during the vibration process. The isolation chip 10' with the vibrators 16' is also difficult to mass produce. At the same time, it also increases the cost of a disposable isolation chip 10'.

Figure 2:
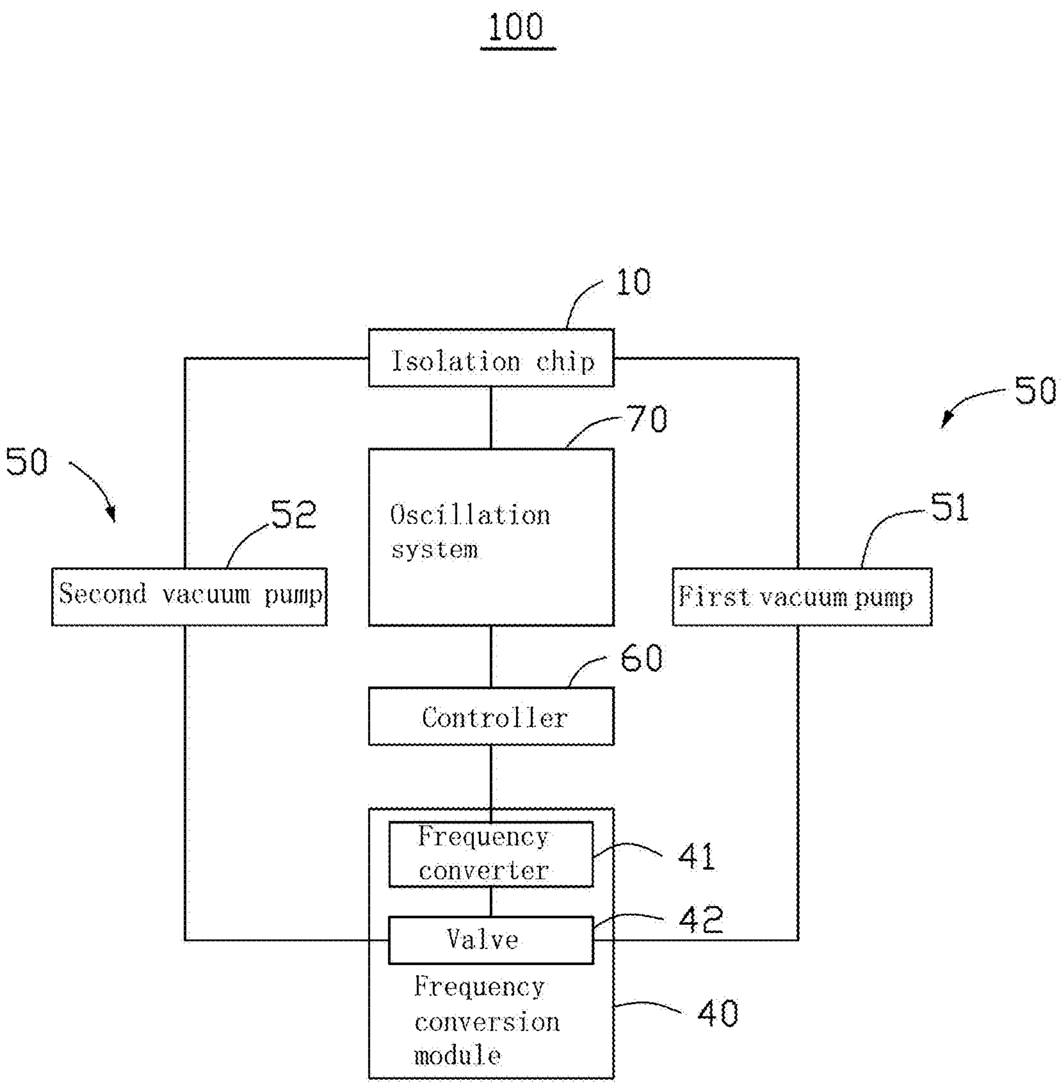
FIG. 2 is a block diagram of an isolation control system of an isolation device according to the present disclosure.
Figure 3:
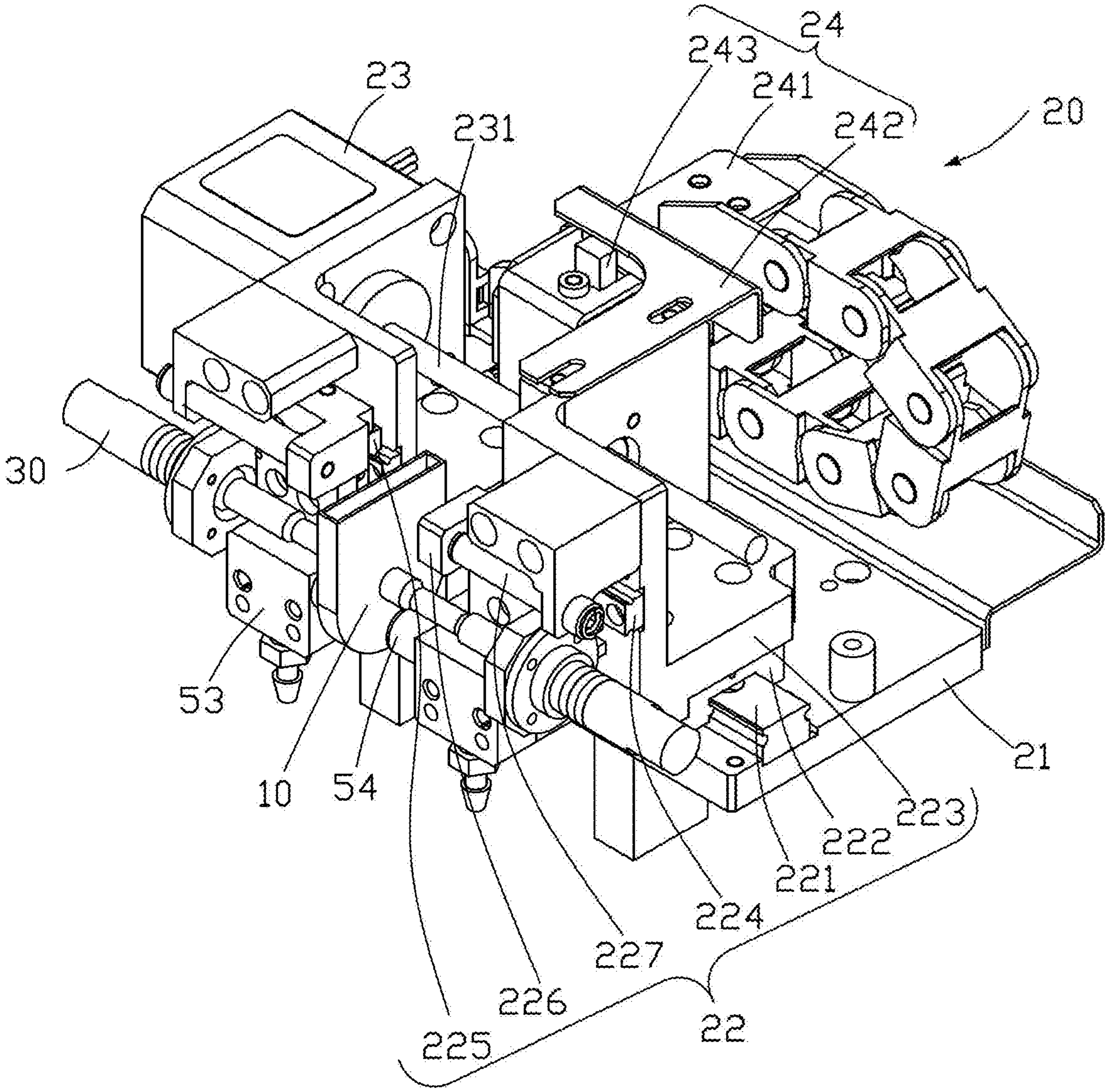
FIG. 3 is a diagrammatic view of an embodiment of an isolation chip connected to an oscillation system and a differential pressure driving system according to the present disclosure.
Figure 4:
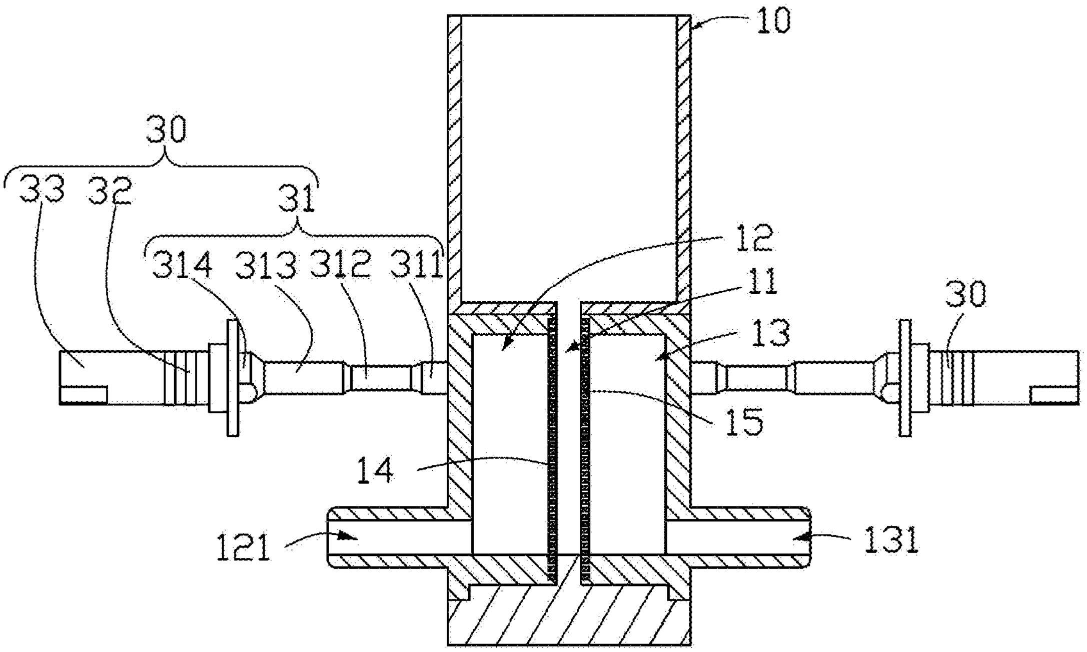
FIG. 4 is a diagrammatic view of an embodiment of an isolation chip connected to two ultrasonic generators according to the present disclosure.

FIGS. 2 to 4 illustrate an embodiment of an isolation device 100 for overcoming the above-mentioned problems of the existing isolation chip 10'. The isolation device 100 includes an isolation chip 10, an oscillation system 70, a differential pressure driving system 50, a frequency conversion module 40, and a controller 60. The isolation chip 10 includes a sample reservoir 11, at least one first chamber 12 disposed on a side of the sample reservoir 11, and at least one second chamber 13 disposed on the other side of the sample reservoir 11 away from the at least one first chamber 12. The first chamber 12 which is closest to the sample reservoir 11 is connected to the sample reservoir 11 through a first filtration membrane 14. The second chamber 13 which is closest to the sample reservoir 11 is connected to the sample reservoir 11 through a second filtration membrane 15. An average pore size of the first filtration membrane 14 and an average pore size of the second filtration membrane 15 are smaller than a size of target particles. The oscillation system 70 includes a pressing assembly 20 and two ultrasonic generators 30 disposed on the pressing assembly 20. The pressing assembly 20 is used to drive the two ultrasonic generators 30 to move towards the isolation chip 10 to make in contact with an outer surface of the outermost first chamber 12 and an outer surface of the outermost second chamber 13. The frequency conversion module 40 is connected to the outermost first chamber 12 and the outermost second chamber 13 through the differential pressure driving system 50. The frequency conversion module 40 is used to control the differential pressure driving system 50 to generate a negative pressure in the first chamber 12 and the second chamber 13 alternately. The controller 60 controls the ultrasonic generators 30 to generate ultrasonic waves when the differential pressure driving system 50 ceases to generate the negative pressures in the first chamber 12 and the second chamber 13. The isolation chip 10 and the ultrasonic generators 30 are disposed separately. The ultrasonic generators 30 can be driven to make in contact with the isolation chip 10 to provide ultrasonic vibration to the isolation chip 10, to vibrate the isolation chip 10. The vibration of the isolation chip 10 prevents the first filtration membrane 14 and the second filtration membrane 15 from clogging, and improves the isolation efficiency and purity. The vibrator does not need to be installed in the isolation chip 10, reducing the manufacturing difficulty and cost of the isolation chip 10.

Figure 5:
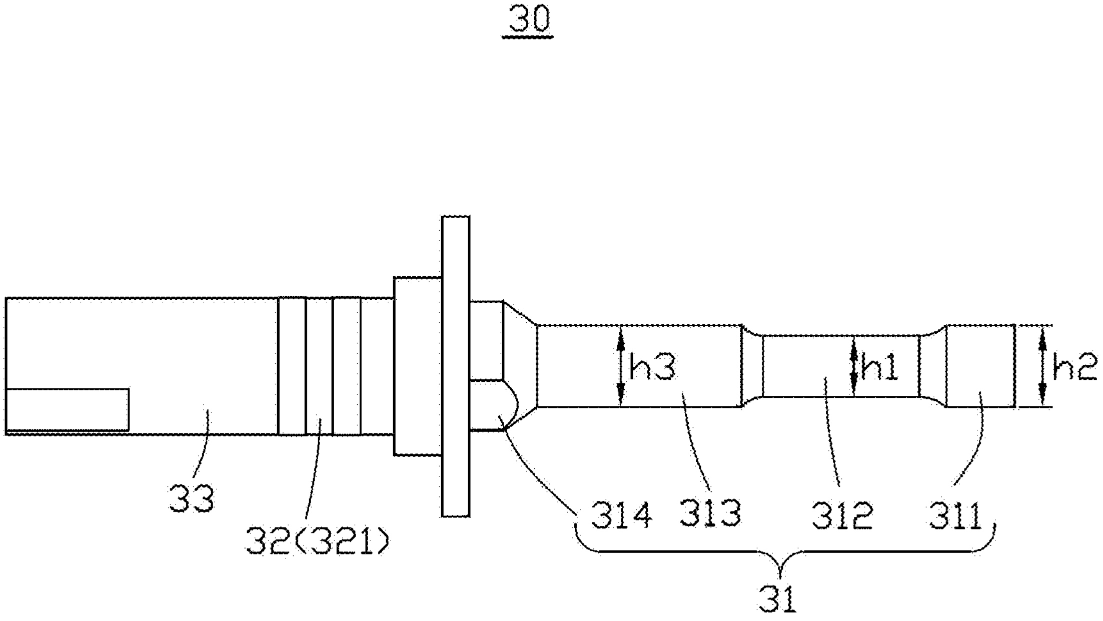
FIG. 5 is a diagrammatic view of an embodiment of an ultrasonic generator according to the present disclosure.
Figure 6:
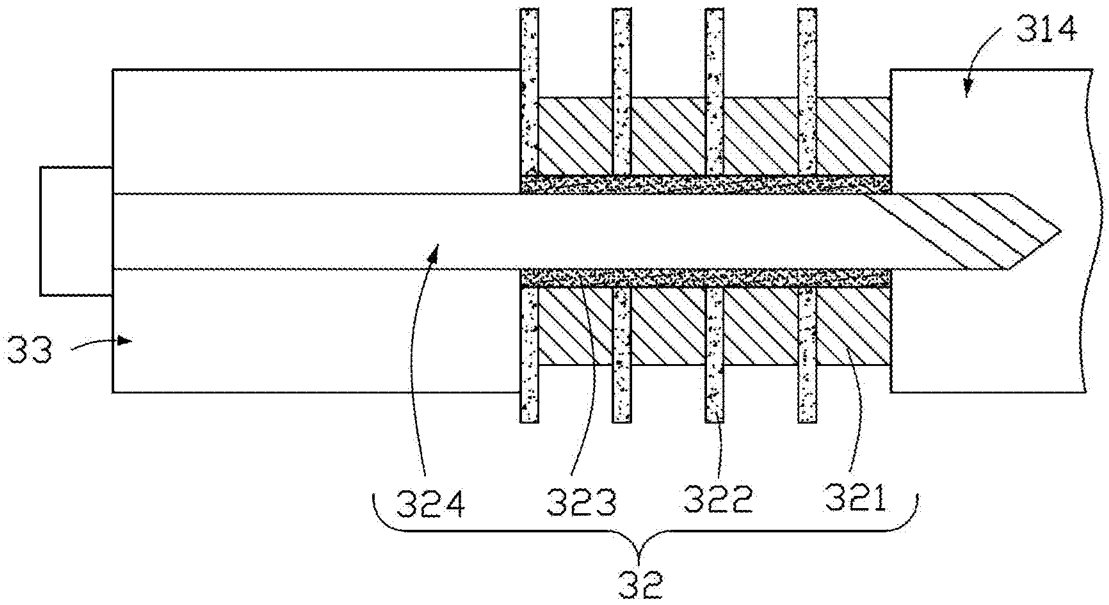
FIG. 6 is a cross-sectional view of an embodiment of the ultrasonic generator according to the present disclosure.
Figure 7A:
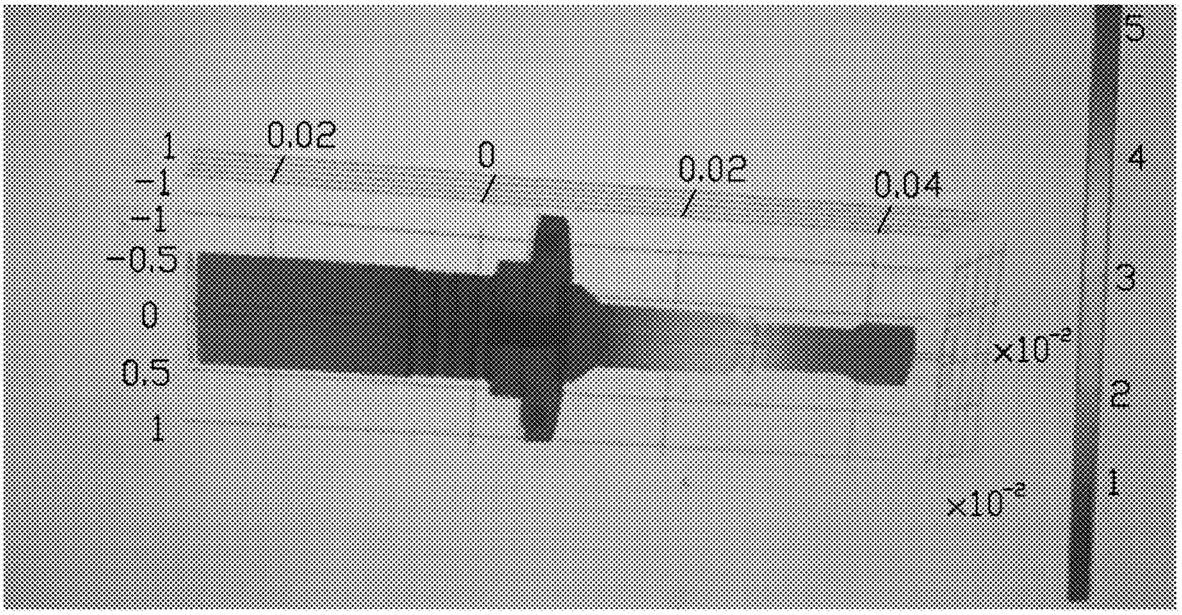
FIGS. 7A, 7B, 7C, and 7D are images showing a vibration process of an ultrasonic generator according to the present disclosure.
Figure 7B:
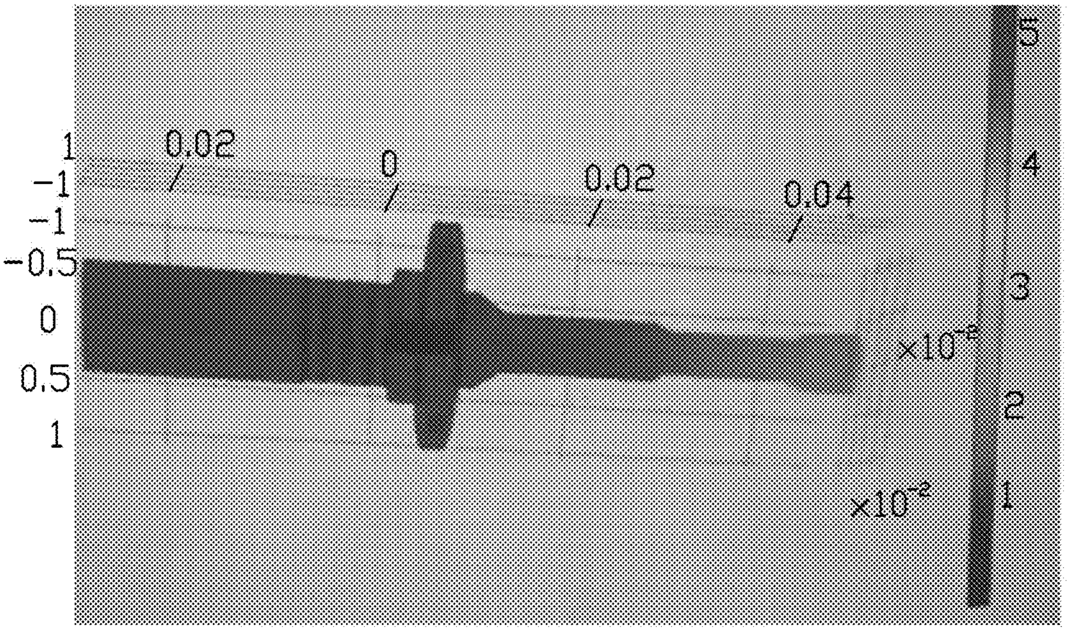
Figure 7C:
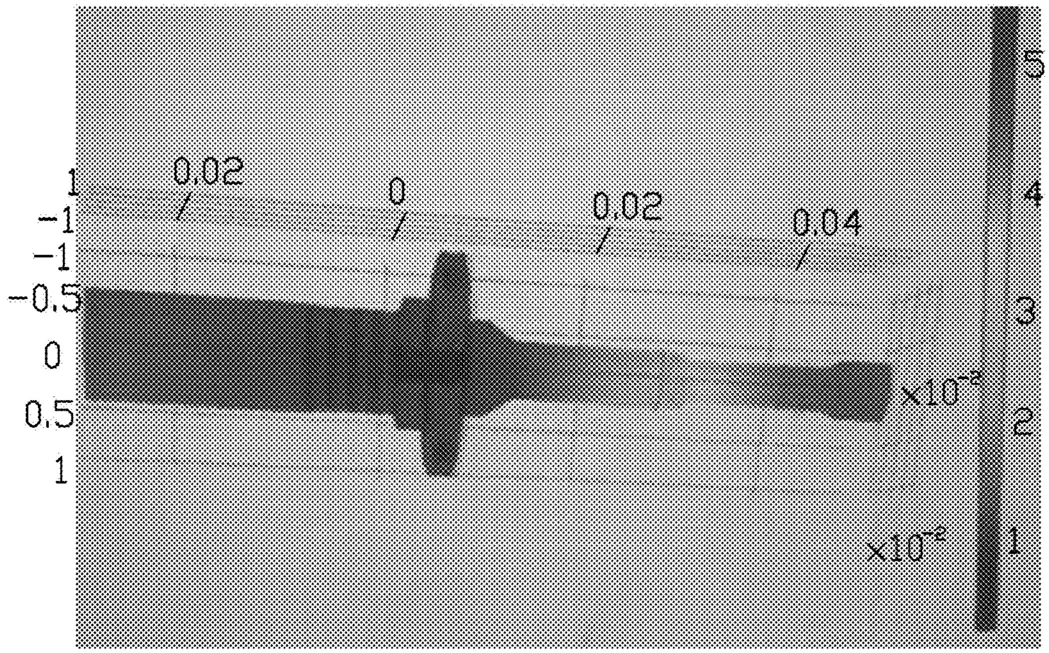
Figure 7D:
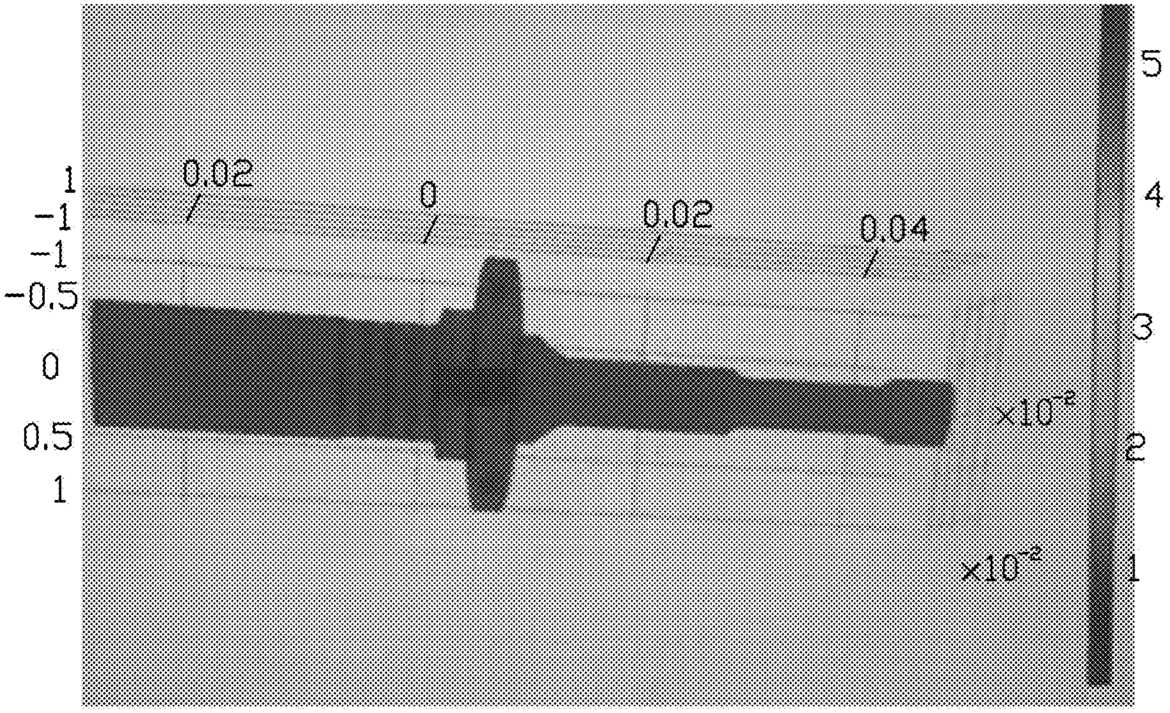

Referring to FIGS. 4 to 6, the ultrasonic generator 30 includes a horn 31 close to the isolation chip 10 and a piezoelectric ceramic unit 32 connected to the horn 31. The piezoelectric ceramic unit 32 is connected to the controller 60 to receive signals. The controller 60 is used to power on or off the piezoelectric ceramic unit 32. The piezoelectric ceramic unit 32 may generate transverse (that is a direction along the length direction of the horn 31) ultrasonic vibration. The transverse ultrasonic vibration transmits to the whole isolation chip 10 through the outmost sidewall of the first chamber 12 and the outmost sidewall of the second chamber 13 to vibrate the isolation chip 10 at a high frequency, and so vibrating the first filtration membrane 14 and the second filtration membrane 15 at a high frequency. The ultrasonic vibration generated by the two ultrasonic generators 30 disturbs the liquid sample and produces an acoustic streaming to prevent the target particles from clogging the first filtration membrane 14 and the second filtration membrane 15 or agglomerating. The target particles disengage quickly from the first filtration membrane 14 and the second filtration membrane 15 and are resuspended in the reflux liquid sample, which prevents the first filtration membrane 14 and the second filtration membrane 15 from clogging and improves the isolation efficiency.

In an embodiment, in order to achieve the above effects, a frequency of the ultrasonic wave generated by each ultrasonic generator 30 is 15 KHz to 80 KHz. Within one period of the ultrasonic vibration, a duty cycle of each ultrasonic wave is 10% to 90%. By controlling the vibration frequency and the duty cycle of the ultrasonic wave within the above ranges, the actual total output power of each ultrasonic generator 30 can be controlled, so as to control the comprehensive vibration effect and the degree of damage to the target particles. Within the above ranges of the vibration frequency and the duty cycle, the total output power of the ultrasonic wave is such that a shell of the isolation chip 10 is penetrated, to transmit vibration into the first filtration membrane 14 and the second filtration membrane 15. The ultrasonic wave can make the filtration membrane vibrate with a certain amplitude, so that the target particles adsorbed on the filtration membrane disengage and resuspended in the reflux liquid sample. At the same time, the ultrasonic wave disturbs the liquid sample and produces an acoustic streaming to separate the agglomerated particles and prevent the target particles from clogging the filtration membrane, which can improve the isolation efficiency. Furthermore, the total output power of the ultrasonic wave within the above frequency and duty cycle ranges is such that no damage is done to the target particles and the quality of isolation and purification is ensured.

In an embodiment, a ratio of change between the two frequencies employed by the two ultrasonic waves is less than or equal to 30%. A ratio of change between the two duty cycles of the two ultrasonic waves is less than or equal to 30%. Since the two ultrasonic generators 30 are disposed on the opposite sides of the isolation chip 10, the transmission directions of the two ultrasonic waves are opposite. The vibration frequency and the duty cycle of the two ultrasonic waves are controlled to be similar, allowing better stability of the isolation chip 10 during a vibration process. Moreover, the acoustic streaming of the liquid sample in the first chamber 12 and the second chamber 13 is similar, which superimposes the energy of the two ultrasonic waves and applies a stronger resonance to the target particles. The resonance may further prevent the filtration membranes from clogging and improve the isolation efficiency.

In an embodiment, the two ultrasonic generators 30 are located on a same horizontal plane. That is, the two ultrasonic waves propagate along opposite directions and are superimposed with each other to further prevent the filtration membrane from clogging and improve the isolation efficiency.

In an embodiment, the controller 60 is used to power on and power off the two ultrasonic generators 30. Within one period of the power on and the power off, a ratio of the power on is 10% to 100%. Controlling the ratio of power on within a period of the power on and power off of the two ultrasonic generators 30 can directly affect the total output power of each ultrasonic generator 30. Different output powers of each ultrasonic generator 30 can be achieved, to isolate different target particles (different in size or different in qualities) from the filtration membrane, prevent different target particles from clogging the filtration membrane, and improve the filtration efficiency.

Referring to FIGS. 4 to 6, the horn 31 includes a first horn portion 311, a second horn portion 312, a third horn portion 313, and a connecting portion 314 connected with each other in that order. The connecting portion 314 is connected to the piezoelectric ceramic unit 32. An end surface of the first horn portion 311 away from the second horn portion 312 is applied in making physical contact with the outer surface of the first chamber 12 or the outer surface of the second chamber 13. In order to obtain the above-mentioned ultrasonic wave, along a direction perpendicular to an extension direction of the horn 31, a size (defined as h1) of the second horn portion 312 is respectively smaller than a size (defined as h2) of the first horn portion 311 and a size (defined as h3) of the third horn portion 313. In an embodiment, the first horn portion 311, the second horn portion 312, and the third horn portion 313 are all cylindrical structures. A length of the second horn portion 312 is approximately in a range of 10 mm-18 mm, preferably 15 mm. A diameter of the second horn portion 312 is approximately in a range of 3 mm-5 mm, preferably 4.5 mm. A length of the first horn portion 311 is approximately in a range of 4 mm-7 mm, preferably 5 mm. A diameter of the first horn portion 311 is approximately in a range of 5.5 mm-6.5 mm, preferably 6 mm. A length of the third horn portion 313 is approximately in a range of 13 mm-17 mm, preferably 15 mm. A diameter of the third horn portion 313 is approximately in a range of 5.5 mm-6.5 mm, preferably 6 mm. FIGS. 7A to 7D show simulations of the ultrasonic wave generated by the ultrasonic generator 30. The horn 31 with the above-mentioned sizes can produce transverse small deformations, the deformation being about 0.04 nm. At this time, the ultrasonic wave is able to disturb the liquid sample in the isolation chip 10 and effectively disengage the target particles attached on the first filtration membrane 14 and the second filtration membrane 15 from the first filtration membrane 14 and the second filtration membrane 15.

Referring to FIGS. 5 and 6, the piezoelectric ceramic unit 32 includes a plurality of piezoelectric ceramic sheets 321, a plurality of electrode sheets 322 stacked with the plurality of piezoelectric ceramic sheets 321, an insulating sleeve 323, and a connector 324. The piezoelectric ceramic sheets 321 are disposed alternately with the electrode sheets 322. The piezoelectric ceramic sheets 321 and the electrode sheets 322 are sleeved on the insulating sleeve 323. The connector 324 penetrates through the insulating sleeve 323 to detachably connect to the horn 31. The frequency of the ultrasonic wave can be adjusted through stacking the piezoelectric ceramic sheets 321 and the electrode sheets 322 into the above-mentioned range, so as to prevent the target particles from clogging the filtration membrane and to improve the filtration efficiency.

In an embodiment, the piezoelectric ceramic unit 32 includes four piezoelectric ceramic sheets 321 and four electrode sheets 322. Two of the electrode sheets 322 are connected to the positive terminal of a power, and the other two of the electrode sheets 322 are connected to the negative terminal of the power. The two electrode sheets 322 connected to the positive terminal are spaced from each other by one electrode sheet 322 connected to the negative terminal.

Referring to FIGS. 5 and 6, the ultrasonic generator 30 further includes an adjusting block 33 disposed on the piezoelectric ceramic unit 32 away from the horn 31. The connector 324 is further connected to the adjusting block 33. The adjusting block 33 is a counterweight and is used to adjust the vibration frequency. By designing a weight of the adjusting block 33, each ultrasonic generator 30 can generate the above-mentioned vibration frequencies.

Referring to FIG. 4, one first chamber 12 and one second chamber 13 are disposed on opposite sides of the sample reservoir 11 of the isolation chip 10. The average pore size of the first filtration membrane 14 and that of the second filtration membrane 15 can be the same or different, depending on the sizes of the target particles to be isolated.

Figure 8:
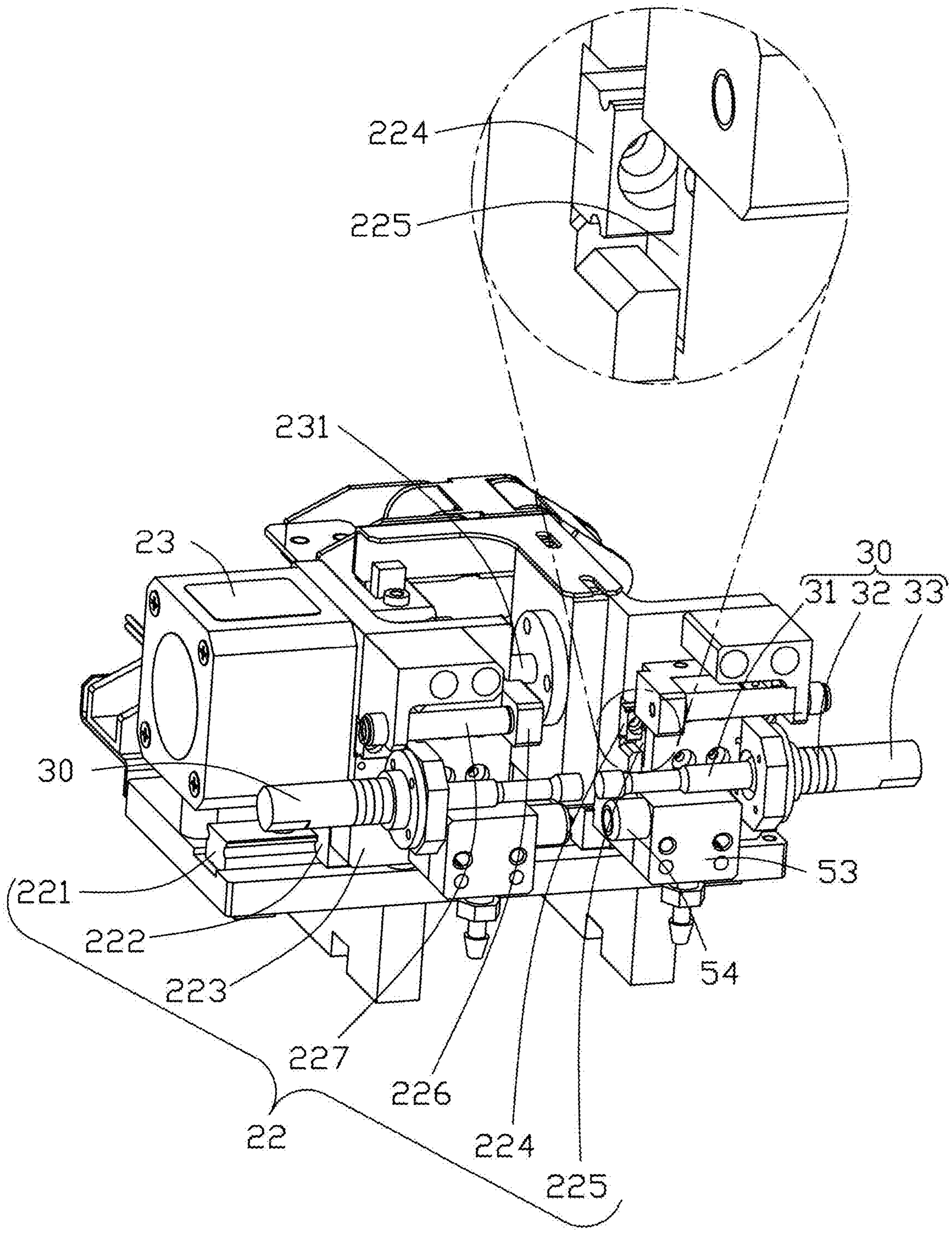
FIG. 8 is a diagrammatic view of an embodiment of an oscillation system and a differential pressure driving system according to the present disclosure.

Referring to FIGS. 3 and 8, the pressing assembly 20 includes a base 21, a moving mechanism 22, and a driving mechanism 23. The moving mechanism 22 is sleeved on a driving shaft 231 of the driving mechanism 23. The driving shaft 231 of the driving mechanism 23 rotates to drive the moving mechanism 22 to move along the driving shaft 231, and further to drive the two ultrasonic generators 30 to move towards the isolation chip 10 to make in contact with the outer surface of the first chamber 12 and the outer surface of the second chamber 13, respectively. The pressing assembly 20 in the present disclosure may realize a linkage of the two ultrasonic generators 30, which can reduce unnecessary positioning mechanisms and simplify a structure of the isolation device 100.

The moving mechanism 22 includes a first slide rail 221 disposed on the base 21, two first sliders 222 disposed sliding on the first slide rail 221, a first mounting plate 223 disposed on each first slider 222, a second slide rail 224 disposed on each first mounting plate 223, a second slider 225 disposed sliding on each second slide rail 224, a second mounting plate 226 disposed on each second slider 225, and two elastic members 227. One ultrasonic generator 30 is disposed on one second mounting plate 226. The ends of each elastic member 227 are connected to one first mounting plate 223 and one corresponding second mounting plate 226.

Each first mounting plate 223 has one ultrasonic generator 30. The driving mechanism 23 drives the driving shaft 231 to rotate, and then drives the two first mounting plates 223 with the two ultrasonic generators 30 to move towards each other, to make in contact with the surface of the isolation chip 10. After making contact, each ultrasonic generator 30 will move away from the isolation chip 10 driven by a reaction force of the isolation chip 10, so as to compress the elastic member 227. When the driving mechanism 23 further drives the first mounting plates 223 to move towards the isolation chip 10, an elastic force of the elastic member 227 will push the ultrasonic generators 30 to press against the isolation chip 10. The driving shaft 231 may be driven to rotate in reverse when it is necessary to separate the ultrasonic generators 30 from the isolation chip 10. The ultrasonic generators 30 can be elastically connected to the isolation chip 10 by the elastic member 227, avoiding a rigid connection between the ultrasonic generators 30 and the isolation chip 10. This reduces a risk of damage to the isolation chip 10 by the ultrasonic generators 30 during a connecting process.

Furthermore, the elastic member 227 is a spring. The elastic member 227 controls the pressure of the ultrasonic generators 30 on the isolation chip 10 by adjusting the Hooke elastic coefficient of the elastic member 227 and a moving distance of the ultrasonic generators 30. In the embodiment, the moving distance between the two ultrasonic generators 30 moving towards each other is about 6 mm, and the Hooke elastic coefficient of the elastic member 227 is 1200 N/m, so the pressure applied on one side of the isolation chip 10 is about 3.2 N.

Figure 9:
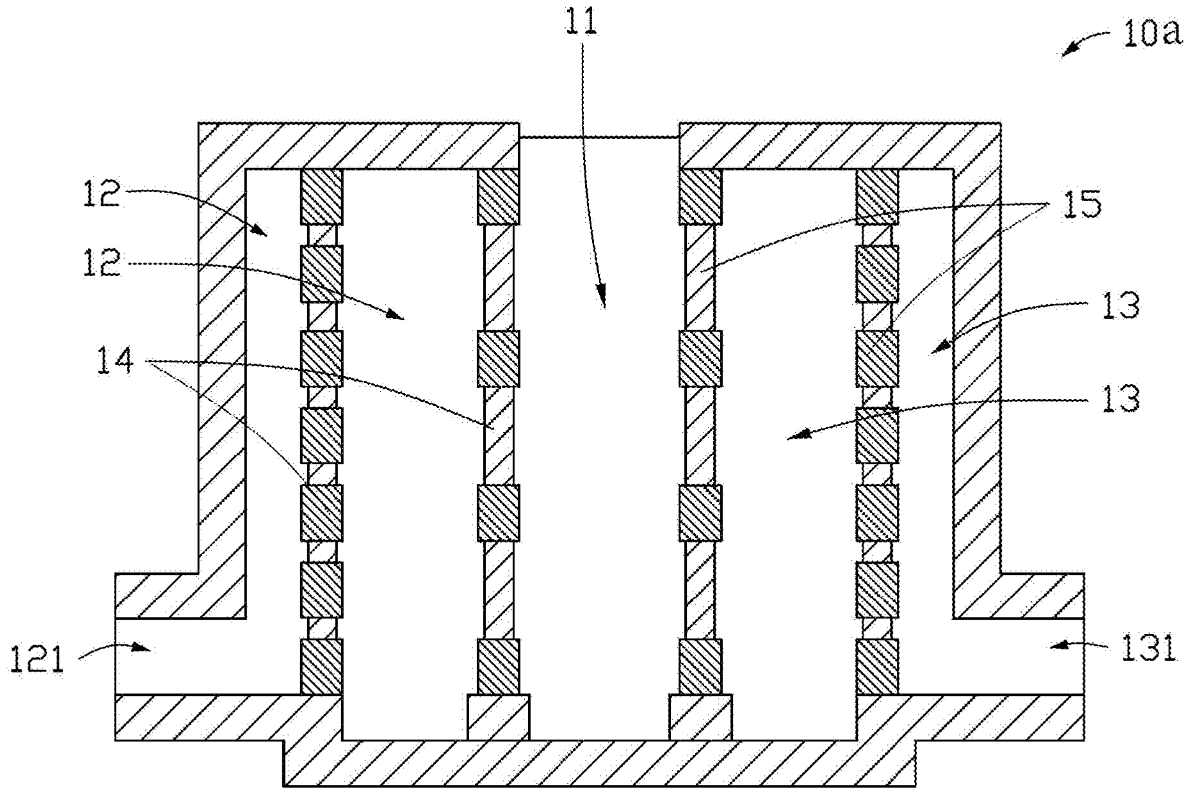
FIG. 9 is a diagrammatic view of another embodiment of an isolation chip according to the present disclosure.

Referring to FIG. 9, it can be understood that, in other embodiment, the isolation chip 10*a* includes a plurality of first chambers 12 and a plurality of second chambers 13. The numbers of each can be designed according to actual needs. In addition, the first chambers 12 or the second chambers 13 can be arranged in parallel (as shown in FIG. 9) or side by side according to a size and structural requirements of the actual isolation chip 10*a*. The two adjacent first chambers 12 are connected through a first filtration membrane 14. The first chamber 12 adjacent to the sample reservoir 11 is connected to the sample reservoir 11 through another first filtration membrane 14. The average pore size of each first filtration membrane 14 can be designed for different sizes of target particles, to separate particles with different sizes at the same time. Similarly, the average pore size of each second filtration membrane 15 may be different. There is a plurality of filtration membranes in the isolation chip 10*a* with a plurality of first chambers 12 and a plurality of second chambers 13, and the filtration membrane with a small average pore size is particularly easily clogged. Due to the installation of a plurality of first filtration membranes 14 and a plurality of second filtration membranes 15, the above-mentioned parameters of the two ultrasonic generators 30 can be adjusted to obtain the optimal output power which can prevent each filtration membrane from clogging. So, the filtration efficiency and the quality are improved. There is no need to install a vibrator on the filtration membrane, which simplifies the structure of the isolation chip 10*a* and reduces the manufacturing difficulty and cost of the isolation chip 10*a*. In addition, the ultrasonic generator 30 has wide application and can be applied to the isolation chip 10 (10*a*) of various structural forms. The ultrasonic generator 30 is separated from the isolation chip 10 (10*a*). The ultrasonic generator 30 is driven to make in contact with the outer surface of the isolation chip 10 (10*a*) when the ultrasonic isolation is required, and the operation is simple.

Referring to FIGS. 1, 3, and 4, the differential pressure driving system 50 is used to generate a negative pressure in the first chamber 12 and the second chamber 13 of the isolation chip 10 alternately. The differential pressure driving system 50 may include two independent differential pressure driving systems, or can be an integral designed differential pressure driving system. The negative pressure is selected according to characteristics of the liquid sample. According to a liquid sample separated by the isolation chip 10 in the present disclosure, the negative pressure of the differential pressure driving system 50 is in a range of −10 KPa to −50 KPa. That is, the negative pressure in the above-mentioned range is alternately applied between the first chamber 12 and the second chamber 13, which can improve the isolation efficiency of the target particles and effectively prevent particles from clogging the filtration membrane. The differential pressure driving system 50 may include a micro vacuum pump or a micro air extraction pump. It can be understood that the differential pressure driving system 50 and the isolation chip 10 can be connected through an airtight connecting pipe 53. In an embodiment, the differential pressure driving system 50 includes a first vacuum pump 51 and a second vacuum pump 52. The first vacuum pump 51 is connected to a first opening 121 of the isolation chip 10 through one connecting pipe 53, and the second vacuum pump 52 is connected to a second opening 131 of the isolation chip 10 through another connecting pipe 53.

In a process of connecting the differential pressure driving system 50 to the isolation chip 10, the two connecting pipes 53 can also be respectively disposed on the pressing assemblies 20. In a process of the linkage of the pressing assemblies 20, the connecting pipes 53 and the ultrasonic generators 30 can be connected to the isolation chip 10 at the same time. In an embodiment, one connecting pipe 53 is disposed on each first mounting plate 223 and is below the corresponding ultrasonic generator 30. The driving mechanism 23 drives the driving shaft 231 to rotate, and then drives the two connecting pipes 53 to move towards each other. The two connecting pipes 53 are thus connected to the first opening 121 and the second opening 131 of the isolation chip 10 to connect the isolation chip 10 to the first vacuum pump 51 and the second vacuum pump 52.

In an embodiment, an elastic sleeve 54 is disposed at an end of each connecting pipe 53 close to the isolation chip 10. In the process of connecting the isolation chip 10 to the vacuum equipment, the joining of the connecting pipes 53 needs to be sealed with the openings 121 (131) of the isolation chip 10. The elastic sleeves 54 can seal the openings 121 (131) after the connecting pipes 53 are connected to the isolation chip 10. In this embodiment, a material of the elastic sleeve 54 is a flexible soft material (such as rubber). The compression amount of the elastic sleeve 54 can be adjusted to achieve a good sealing effect. Specifically, the compression amount of the elastic sleeve 54 is determined by the Shore hardness of the material of the elastic sleeve 54 and the driving force of the driving mechanism 23.

Referring to FIG. 3, the pressing assembly 20 further includes a displacement sensing unit 24. The displacement sensing unit 24 is used to measure the moving distance of the ultrasonic generators 30 and the connecting pipes 53 during operations. Then the controller 60 may control the pressure of the ultrasonic generators 30 and the connecting pipes 53 on the isolation chip 10. The displacement sensing unit 24 includes a first connecting piece 241, a second connecting piece 242, and an optocoupler 243 disposed on the first connecting piece 241. The first connecting piece 241 and the second connecting piece 242 are respectively fixed on the two first mounting plates 223. One end of the second connecting piece 242 close to the first connecting piece 241 is slidably connected to the optocoupler 243. The driving mechanism 23 is further used to drive the first connecting piece 241 and the second connecting piece 242 to move along the driving shaft 231. The optocoupler 243 senses the relative moving distances of the first connecting piece 241 and the second connecting piece 242. By adding the displacement sensing unit 24 to sense the moving distance of the ultrasonic generators 30 and the connecting pipes 53, the connection between the ultrasonic generators 30 and the isolation chip 10, and between the connecting pipes 53 and the isolation chip 10, can be better controlled to achieve the best connection effect.

The frequency conversion module 40 is electrically connected to the differential pressure driving system 50, and provides electric power to the differential pressure driving system 50, so that the negative pressure can be alternately generated in the first chamber 12 and in the second chamber 13. In an embodiment, the frequency conversion module 40 includes a frequency converter 41 and a valve 42 connected to the frequency converter 41. The valve 42 can be a liquid path converter, including but not limited to, an electromagnetic valve or a rotary valve. The valve 42 is alternately switched to connect to one and then the other of the first vacuum pump 51 and the second vacuum pump 52, to cause the first vacuum pump 51 and the second vacuum pump 52 to alternately apply the negative pressure. That is, when the valve 42 connects to the first vacuum pump 51, the frequency converter 41 controls the first vacuum pump 51 to operate, which generates the negative pressure in each first chamber 12 by evacuating through the first opening 121. Thus, the compositions in the sample reservoir 11 that are smaller than the pores of the corresponding first filtration membrane 14 can pass through the corresponding first filtration membrane 14 under the negative pressure and enter the corresponding first chamber 12. Then, the frequency converter 41 controls the first vacuum pump 51 to stop operating, and the valve 42 is switched to connect to the second vacuum pump 52. The frequency converter 41 controls the second vacuum pump 52 to operate, which generates the negative pressure in each second chamber 13 by evacuating through the second opening 131. Thus, the compositions in the sample reservoir 11 that are smaller than the pores of the corresponding second filtration membrane 15 can pass through the corresponding second filtration membrane 15 under the negative pressure and enter the corresponding second chamber 13. Then, the frequency converter 41 controls the second vacuum pump 52 to stop operating. The above-described procedures are repeated until complete isolation is achieved.

The controller 60 controls the two ultrasonic generators 30 to vibrate to generate two ultrasonic waves when the frequency conversion module 40 stops generating the negative pressure in the first chamber 12. The controller 60 further controls the two ultrasonic generators 30 to vibrate to generate two ultrasonic waves when the frequency conversion module 40 stops generating the negative pressure in the second chamber 13. That is, the controller 60 is electrically connected to the first vacuum pump 51 and the second vacuum pump 52. When the first vacuum pump 51 or the second vacuum pump 52 stops operating, the controller 60 determines that the first vacuum pump 51 stops generating the negative pressure in the first chamber 12, or the second vacuum pump 52 stops generating the negative pressure in the second chamber 13. At this time, the controller 60 controls the two ultrasonic generators 30 to vibrate.

Figure 10:
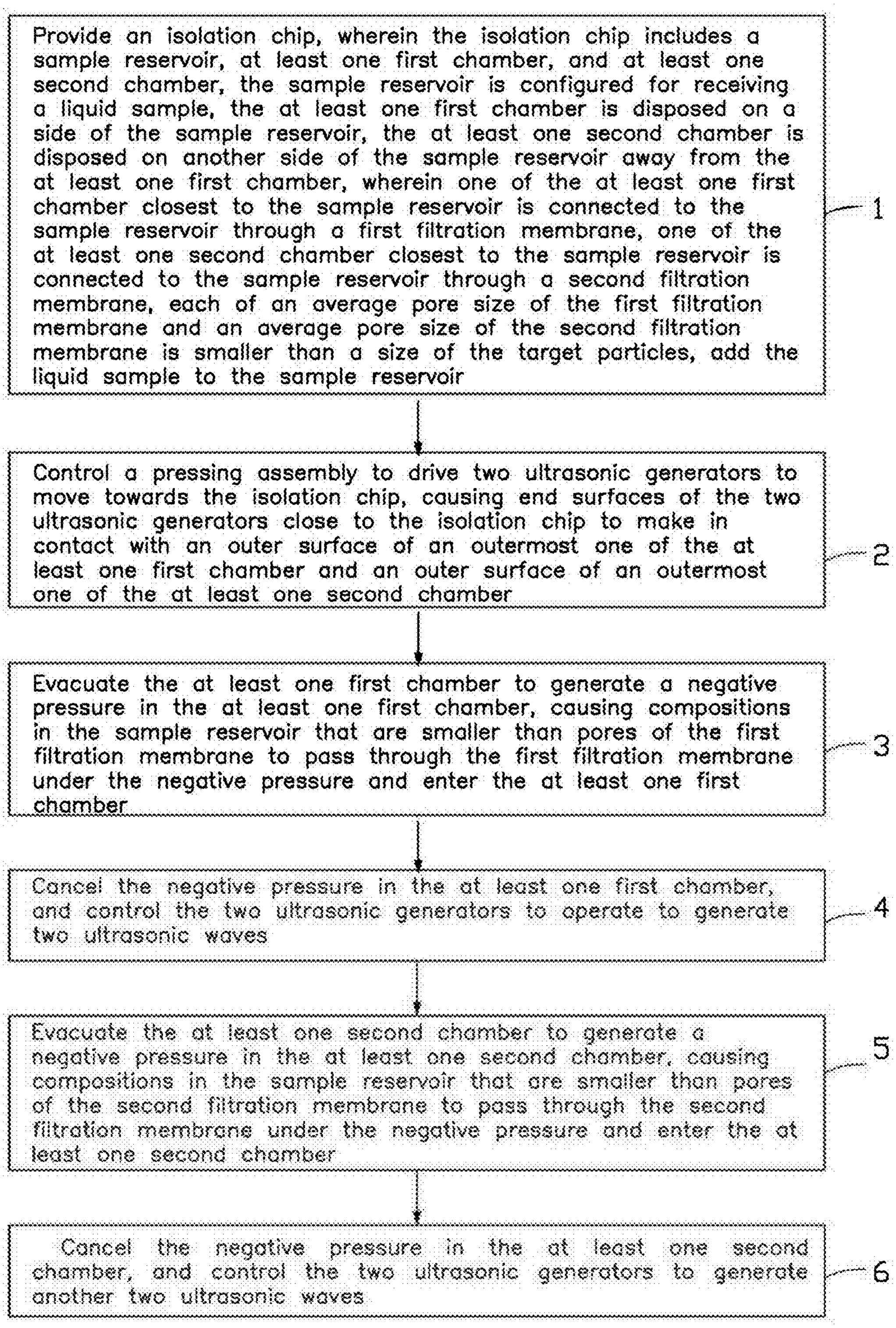
FIG. 10 is a block diagram of an embodiment of an isolation method for isolating target particles from liquid samples is further provided according to the present disclosure.

FIG. 10 illustrates an embodiment of an isolation method for isolating target particles from liquid samples is further provided according to the present disclosure. The method is provided by way of embodiments, as there are a variety of ways to carry out the method. The example method can begin at block 1.

At block 1, the isolation chip 10 is provided. The liquid sample is added into the sample reservoir 11 of the isolation chip 10.

At block 2, the pressing assembly 20 is controlled to drive the two ultrasonic generators 30 to move towards the isolation chip 10, so that end surfaces of each ultrasonic generator 30 close to the isolation chip 10 make in contact with an outer surface of the outermost first chamber 12 and an outer surface of the outermost second chamber 13.

The two connecting pipes 53 are driven by the pressing assembly 20 to connect to the first opening 121 and the second opening 131 when the ultrasonic generators 30 are connected to the isolation chip 10, so that the first opening 121 and the second opening 131 are connected to the differential pressure driving system 50.

At block 3, a negative pressure is applied to the first chamber 12 by evacuating through the first opening 121.

The differential pressure driving system 50 applies the negative pressure in the at least one first chamber 12 by evacuating through the first opening 121. Thus, the compositions in the sample reservoir 11 that are smaller than the pores of the corresponding first filtration membrane 14 can pass through the corresponding first filtration membrane 14 under the negative pressure and enter the at least one first chamber 12.

At block 4, the two ultrasonic generators 30 are controlled to vibrate to generate two ultrasonic waves when the negative pressure in the at least one first chamber 12 is cancelled. At the same time, the negative pressure is applied to at least one second chamber 13 by evacuating through the second opening 131.

The ultrasonic wave can make the liquid sample, the first filtration membrane 14, and the second filtration membrane 15 vibrate at high frequencies. Thus, the target particles adsorbed in the pores of the filtration membrane quickly disengage from the pores to be re-suspended in the liquid sample. Furthermore, clogging of the filtration membrane can be avoided. At the same time, the differential pressure driving system 50 applies the negative pressure in the second chamber 13 by evacuating through the second opening 131. Thus, the components adsorbed on the first filtration membrane 14 move back to the sample reservoir 11 with an air flow and/or a liquid flow. The compositions in the sample reservoir 11 that are smaller than the pores of the corresponding second filtration membrane 15 can pass through the corresponding second filtration membrane 15 under the negative pressure and enter the at least one second chamber 13.

At block 5, the two ultrasonic generators 30 are controlled to vibrate to generate two ultrasonic waves when the negative pressure in the at least one second chamber 13 is cancelled.

Then, the steps 3 to 5 can be repeated a number of times to further remove the compositions in the liquid sample which have sizes smaller than the sizes of the pores of the corresponding filtration membranes, and causing the target particles which have sizes larger than the sizes of the pores of the corresponding filtration membrane to remain in the sample reservoir 11. Thus, a better isolation and purification effect is achieved.

Compared with the related art, the isolation chip 10 and the ultrasonic generators 30 are disposed separately in the isolation device 100. The pressing assembly 20 can drive the ultrasonic generators 30 to move to make in contact with the isolation chip 10 to provide ultrasonic waves for the isolation chip 10 to make the isolation chip 10 vibrate. Thus, clogging of the first filtration membrane 14 and the second filtration membrane 15 can be avoided, and the isolation efficiency and purity are improved. The vibrator does not need to be installed in the isolation chip 10, reducing the manufacturing difficulty and cost.

The ultrasonic generator 30 has a specific structure and parameters matching the isolation chip 10. The ultrasonic wave generated by the ultrasonic generator 30 can ensure the particles attached on the first filtration membrane 14 and the second filtration membrane 15 will be disengaged. Thus, clogging of the first filtration membrane 14 and the second filtration membrane 15 can be avoided, and the isolation efficiency and purity are improved.

The pressing assembly 20 can realize the linkage of the two ultrasonic generators 30, so that the two ultrasonic generators 30 can make in contact with or can separate from the isolation chip 10. The linkage process is simple, and the ultrasonic generators 30 make firm contact with the isolation chip 10, ensuring that the ultrasonic waves can be transmitted to the first filtration membrane 14 and the second filtration membrane 15 without damaging the isolation chip 10.

By setting the two connecting pipes 53 on the pressing assembly 20, the connection among the ultrasonic generators 30, the differential pressure driving system 50, and the isolation chip 10 can be realized at the same time during the linkage process. Thus, the connection structure can be simplified, and the complexity of the structure and the difficulty of operation can be reduced.

What is claimed is:

1. An isolation device for isolation of target particles from a liquid sample, comprising:
- an isolation chip comprising:
  - a sample reservoir configured for receiving the liquid sample;
  - at least one first chamber disposed on a side of the sample reservoir; and
  - at least one second chamber disposed on another side of the sample reservoir away from the at least one first chamber, wherein one of the at least one first chamber closest to the sample reservoir is connected to the sample reservoir through first filtration membrane, one of the at least one second chamber closest to the sample reservoir is connected to the sample reservoir through second filtration membrane, each of an average pore size of the first filtration membrane and an average pore size of the second filtration membrane is smaller than a size of the target particles;
- an oscillation system comprising:
  - a pressing assembly; and
  - two ultrasonic generators disposed on the pressing assembly, wherein the pressing assembly is configured to drive the two ultrasonic generators to move towards the isolation chip to make in contact with an outer surface of an outermost one of the at least one first chamber and an outer surface of an outermost one of the at least one second chamber;
- a differential pressure driving system;
- a frequency conversion module connected to the outermost one of the at least one first chamber and the outermost one of the at least one second chamber through the differential pressure driving system, the frequency conversion module configured to control the differential pressure driving system to generate a negative pressure in the at least one first chamber and the at least one second chamber alternately; and
- a controller configured to control the two ultrasonic generators to vibrate to generate two ultrasonic waves when the differential pressure driving system stops to generate the negative pressure in the at least one first chamber or the at least one second chamber, the controller further configured to power on and power off the two ultrasonic generators, within a period of the power on and the power off, a ratio of the power on is 10% to 100%.

2. The isolation device of claim 1, wherein a frequency of each of the two ultrasonic waves is 15 KHz to 80 KHz, and
- within a period of each of the two ultrasonic waves, a duty cycle of each of the two ultrasonic waves is 10% to 90%.

3. The isolation device of claim 2, wherein a ratio of change between two frequencies of the two ultrasonic waves is less than or equal to 30%, and a ratio of change between two duty cycles of the two ultrasonic waves is less than or equal to 30%.

4. The isolation device of claim 1, wherein the two ultrasonic generators are located on a same horizontal plane.

5. The isolation device of claim 1, wherein each of the two ultrasonic generators comprises a horn close to the isolation chip and a piezoelectric ceramic unit connected to the horn.

6. The isolation device of claim 5, wherein the horn comprises a first horn portion, a second horn portion, a third horn portion, and a connecting portion connected with each other in that order, the connecting portion is connected to the piezoelectric ceramic unit, an end surface of the first horn portion away from the second horn portion is configured to make in contact with the outer surface of the outermost one of the at least one first chamber or the outer surface of the outermost one of the at least one second chamber, wherein along a direction perpendicular to an extension direction of the horn, a size of the second horn portion is respectively smaller than a size of the first horn portion and a size of the third horn portion.

7. The isolation device of claim 5, wherein the piezoelectric ceramic unit comprises a plurality of piezoelectric ceramic sheets, a plurality of electrode sheets stacked with the plurality of piezoelectric ceramic sheets, an insulating sleeve, and a connector, the plurality of piezoelectric ceramic sheets are disposed alternately with the plurality of electrode sheets, the plurality of piezoelectric ceramic sheets and the plurality of electrode sheets are sleeved on the insulating sleeve, the connector penetrates through the insulating sleeve to detachably connect to the horn.

8. The isolation device of claim 7, wherein each of the two ultrasonic generators further comprises an adjusting block disposed on the piezoelectric ceramic unit away from the horn, the connector is further connected to the adjusting block.

9. The isolation device of claim 1, wherein the isolation chip comprises a plurality of first chambers and a plurality of second chambers,
- two adjacent of the plurality of first chambers are connected through another first filtration membrane, and two adjacent of the plurality of second chambers are connected through another second filtration membrane.

* * * * *